United States Patent [19]

Toliusis et al.

[11] Patent Number: 4,915,134
[45] Date of Patent: Apr. 10, 1990

[54] THREE-WAY POPPET VALVE WITH HOLLOW STEM

[75] Inventors: Vytautas J. Toliusis, Paw Paw Township, Van Buren County; Thomas Tinholt, Galesburg, both of Mich.

[73] Assignee: Humphrey Products Company, Kalamazoo, Mich.

[21] Appl. No.: 386,871

[22] Filed: Jul. 27, 1989

[51] Int. Cl.⁴ .......................................... F15B 13/044
[52] U.S. Cl. ............................ 137/625.65; 137/625.27; 251/129.07
[58] Field of Search ....................... 137/625.27, 625.65; 251/129.07

[56] References Cited

U.S. PATENT DOCUMENTS

| | | |
|---|---|---|
| 2,934,090 | 4/1960 | Kenann et al. .............. 137/625.27 X |
| 3,538,954 | 11/1970 | Fagerlie et al. . |
| 4,026,325 | 5/1977 | Loveless . |
| 4,074,700 | 2/1978 | Engle ........................ 137/625.65 X |
| 4,100,519 | 7/1978 | Neff ........................... 137/625.65 X |
| 4,103,711 | 8/1978 | Arvin . |
| 4,267,862 | 5/1981 | Neff et al. . |
| 4,301,715 | 11/1981 | Acar . |
| 4,442,998 | 4/1984 | Ohyama et al. .............. 137/625.5 X |
| 4,485,846 | 12/1984 | Neff . |
| 4,494,572 | 1/1985 | Loveless . |
| 4,566,490 | 1/1986 | Neff . |
| 4,574,844 | 3/1986 | Neff et al. . |
| 4,823,842 | 4/1989 | Toliusis . |
| 4,842,020 | 6/1989 | Tinholt . |

OTHER PUBLICATIONS

Skinner K4M valve brochure (9 pages).
Mac 35 Series publication, Mac Valves, Inc. 1986, 5 pages.
Mac 100 Series publication, Mac Valves, Inc. 1983, 4 pages.
Mac 200 Series publication, Mac Valves, Inc. 1983, 4 pages.
Mac 45 Series, Mac Valves, Inc. 1986, 5 pages.
Mac 900 Series, Mac Valves, Inc. 1983, 2 pages.

Primary Examiner—Gerald A. Michalsky
Attorney, Agent, or Firm—Flynn, Thiel, Boutell & Tanis

[57] ABSTRACT

A valve assembly having a single stem slidably supported within a bore formed in a one-piece valve body provided with three ports which communicate with the bore at axially spaced locations therealong. The axially centermost port functions as a load port. The valve stem has a single valve poppet mounted thereon in encircling relationship thereto, which valve poppet is axially movable between a pair of opposed valve seats formed on the valve body for controlling communication between the load port and the bore. The stem has a passageway extending axially therethrough to maintain a balanced pressure axially of the valve stem.

6 Claims, 1 Drawing Sheet

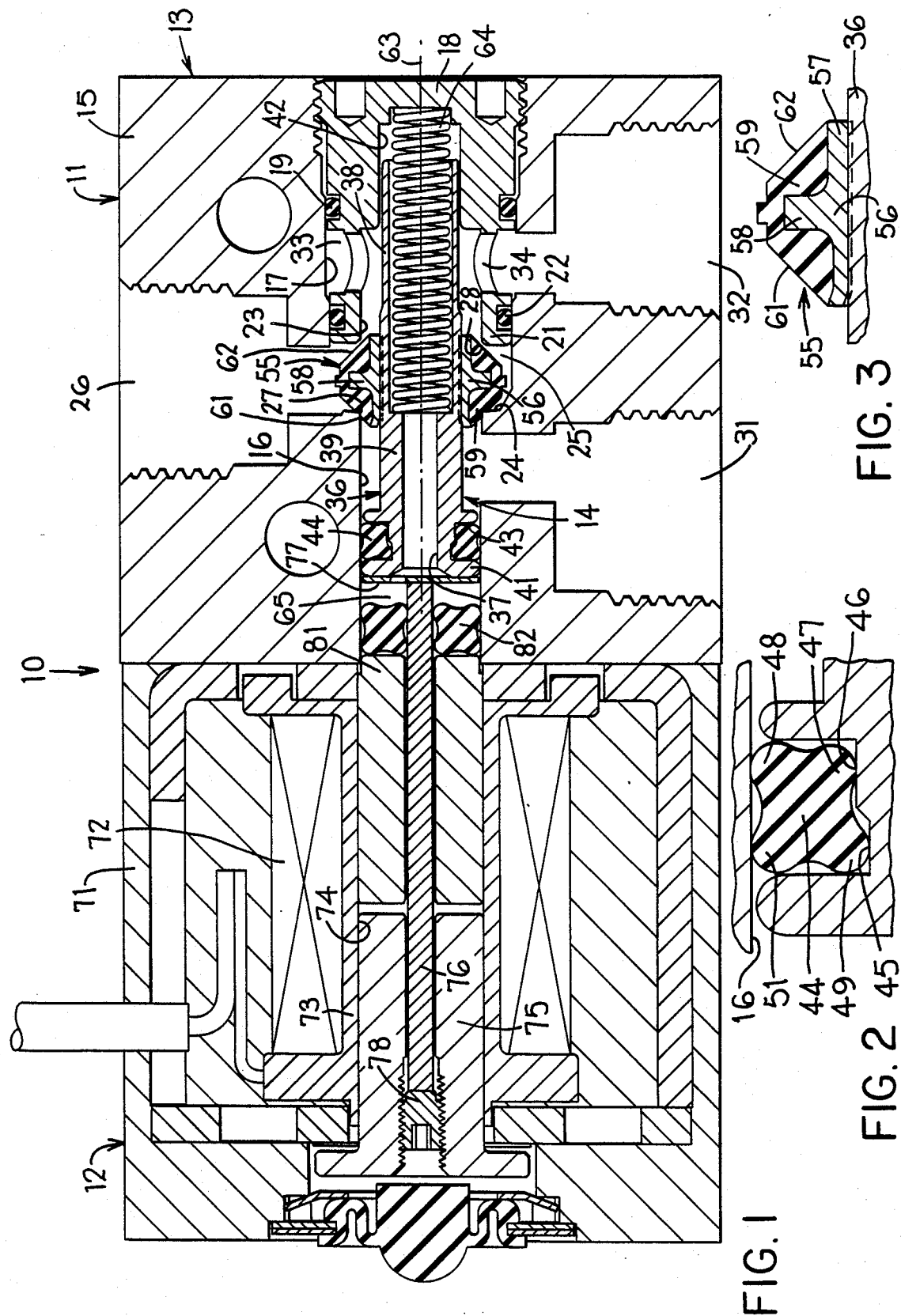

THREE-WAY POPPET VALVE WITH HOLLOW STEM

FIELD OF THE INVENTION

This invention relates to an improved poppet-type, miniaturized three-way valve assembly which is particularly desirable for direct actuation by an electric solenoid.

BACKGROUND OF THE INVENTION

Numerous spool-type valve assemblies have been developed for controlling liquids and gases, and such assemblies incorporate a wide range of structural and functional features. Such assemblies have, for many years, been of substantial size. Modern technology, however, has increasingly demanded that such valve assemblies be made of extremely small size, particularly for use in control circuits. Such assemblies must also permit shifting of the valve with extremely small force without detracting from the desired response time and/or flow.

One problem associated with known valve assemblies, specifically three-way valves employing a shiftable spool or stem, has been the inability to substantially minimize the size of the shiftable valve spool and also minimize the number of sliding seal contact points to thus minimize the friction force which must be overcome to permit breakaway of the valve spool during shifting thereof. In addition, prior valves of this general type have often relied on multiple sliding seals for effecting isolation between the various ports, and while some known valves have relied on a poppet, nevertheless the poppet itself has been structurally more complex than desired or has performed in less than in optimum manner.

Accordingly, it is an object of the present invention to provide an improved poppet-type three-way valve assembly which is believed to be advantageous in comparison to prior valve assemblies of this general type with respect to manufacturing economy, size and performance.

In the improved valve assembly of this invention, a single stem is slidably supported within a bore formed in a one-piece valve body provided with three ports which communicate with the bore at axially spaced locations. The axially centermost port functions as a load port, and the valve stem has a single valve poppet mounted thereon in encircling relationship thereto, which valve poppet is axially movable between a pair of opposed valve seats formed on the valve body for controlling communication between the load port and the bore. The stem has a passageway extending axially therethrough so as to maintain a balanced pressure axially of the valve stem.

The valve assembly, as aforesaid, incorporates an improved poppet valve mounted on the stem, which poppet valve comprises a single elastomeric poppet ring molded around a radially extending rigid support flange mounted on an axially elongated support sleeve, which support sleeve has a press fit with the valve stem. The elastomeric poppet ring integrally defines poppet seal faces on opposite axial sides thereof, and the poppet ring possesses a significant quantity of elastomeric material disposed behind each of the poppet seal faces, whereby the sealing performance of the poppet relative to the opposed valve seats is believed significantly improved.

Other objects and purposes of the present invention will be apparent to persons familiar with assemblies of this general type upon reading the following specification and inspecting the accompanying drawings.

BRIEF DESCRIPTION OF THE DRAWINGS

FIG. 1 is a central sectional view of a valve assembly according to the present invention.

FIGS. 2 and 3 are enlarged, fragmentary sectional views of portions of FIG. 1.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the valve assembly and designated parts thereof. Said terminology will include the words specifically mentioned, derivatives thereof, and words of similar import.

DETAILED DESCRIPTION

FIG. 1 illustrates a valve unit 10 formed by a three-way valve assembly 11 connected to a solenoid operator 12. The valve assembly 11 includes a housing arrangement 13 having a single shiftable valve arrangement 14 coaxially slidably and sealingly disposed therein.

The housing arrangement 13 includes a monolithic one-piece integral valve body 15 having a stepped bore extending therethrough, which stepped bore includes a first bore 16 which extends inwardly from one end face of the valve body through approximately one-half the thickness of the valve body. This bore 16, substantially at the middle of the valve body, coaxially communicates with an enlarged diameter bore 17 which projects outwardly through the other end face of the valve body. The outer end portion of the bore 17 is internally threaded.

Housing arrangement 13 also includes an end cap 18 which is threaded into the outer end of the bore 17 so as to sealingly close off the outer end thereof. A conventional elastomeric O-ring 19 externally surrounds the end cap 18 and sealingly engages the wall of the bore 17. End cap 18 also has a cylindrical sleeve part 21 which projects coaxially inwardly thereof into the bore 17, which sleeve part 21 adjacent the free end thereof mounts therearound a further elastomeric O-ring 22 which sealingly engages the wall of the bore 17. This sleeve part 21 has a cylindrical bore 23 opening outwardly through the axially inner end thereof, which bore 23 is coaxially aligned with and of substantially the same inside diameter as the bore 16.

The free end of the sleeve part 21 is spaced axially a predetermined distance from an annular shoulder 24 as defined at the interface between the bores 16 and 17. This shoulder 24 and the axially opposed end face of the sleeve part 21 define therebetween an annular chamber 25 which in turn communicates with a port 26. This port 26 opens sidewardly through the housing and functions as a load port. Port 26, through its communication with the annular chamber 25, is adapted for selected communication with the aligned bores 16 and 23 substantially at the midpoint of the stepped bore 16–17.

The shoulder 24, substantially at the diameter of the bore 16, defines thereon an annular valve seat 27, which valve seat faces generally axially toward a similar valve seat 28 as formed on the free end of the sleeve part 21. This latter valve seat 28 is defined on the inner corner substantially at the diameter of the bore 23, whereby the axially opposed valve seats 27 and 28 are of the same diameter.

The valve body 15 also has additional ports 31 and 32 formed therein for communication with the stepped bore 16-17 at locations which are disposed on axially opposite sides of the port 26. The port 31 is disposed in direct communication with the bore 16. The other port 32 directly communicates with an annular chamber 33 which is defined within bore 17 in surrounding relationship to the sleeve part 21, which chamber 33 is sealed at opposite axial ends by the O-rings 19 and 22. Chamber 33 in turn continuously communicates with the interior of bore 23 by means of ports or openings 34 formed radially through the sleeve part 21.

When the valve unit 10 functions as a normally closed valve, then port 31 functions as the inlet or supply, and port 32 functions as the exhaust. Conversely, when the valve unit functions as a normally opened valve, then port 32 functions as the supply and port 31 functions as the exhaust.

Considering now the shiftable valve arrangement 14, it includes a one-piece valve stem formed substantially by a hollow elongated cylindrical rod 36 having an opening or bore 37 extending generally coaxially therethrough. This rod 36 is of a generally externally stepped configuration throughout the axial length thereof and includes a first minimal diameter end portion 38 joined to an intermediate rod portion 39 which is of slightly greater exterior diameter. Rod portion 39 in turn joins to an end rod portion 41 which is of greater exterior diameter.

As illustrated by FIG. 1, the rod end portion 38 is loosely slidably but non-sealingly supported within a blind bore 42 which is formed coaxially into the end cap 18. This blind bore 42 is of smaller diameter than the bore 23. The other end rod portion 41 is sized so as to be slidably accommodated within the bore 16 axially outwardly from the port 31. This rod portion 41 has an annular groove 43 therearound in which is confined an elastomeric seal ring 44. This seal ring 44 is preferably constructed so as to have a generally X-shaped cross section defined by four uniform beads, namely a pair of axially spaced radially outer beads and a pair of axially spaced radially inner beads, such beads all being integrally joined to form a single integrally-molded ring. Such ring is conventionally known as a "quad" ring.

To create a desirable sealed relationship but at the same time minimize the frictional force which tends to impede relative sliding of the valve arrangement with respect to the housing, the bottom of the groove 43 is preferably provided with a stepped wall arrangement (FIG. 2) including first and second annular support walls 45 and 46 which are axially adjacent and of slightly different diameters, the diametral difference preferably being in the range of between about 0.009 inch and about 0.015 inch. With this arrangement, one of the radially inner lobes 47 of seal ring 44 contacts the larger diameter surface 46, whereby the radially inner lobe 47 and the adjacent radially outer lobe 48 are sufficiently axially compressed between the surface 46 and the bore wall 16 so as to create annular areas of sealed engagement. The other radially inner lobe 49, which is disposed for engagement with the smaller diameter surface 45, is not subject to any significant compression, whereby the lobe 49 and the adjacent radially outer lobe 51 contact the respective surface 45 and bore wall 16 but do not have intimate sealing contact therewith. Thus, the frictional forces generated at the contact areas with the lobes 49 and 51 are greatly minimized. However, the use of the quad ring 44 still permits the desired support and stability which can be achieved using an elastomeric seal ring of this type, while eliminating the problems which are conventionally associated with a standard O-ring (such as problems created by the mold parting line), but with this support arrangement the sealing occurs substantially only at a single radially inner and radially outer seal contact area so that frictional force tending to resist relative sliding movement can thus be significantly minimized.

The valve arrangement 14 has a single poppet valve 55 stationarily mounted on the rod 36 in surrounding relationship thereto and substantially axially midway between the ends thereof. The poppet valve 55 is disposed for cooperation between the axially opposed valve seats 27-28.

As shown in FIG. 3, the poppet valve 55 includes a generally rigid support ring 56 which includes, as a primarily part thereof, an axially elongated sleeve part 57 having an inner diameter which is slightly less than the outer diameter of intermediate rod portion 39 so as to create an interference or press fit therebetween. The inner diameter of this sleeve part 57, however, is greater than the outer diameter of rod part 38 so as to enable the poppet valve to freely axially pass over the rod part 38. Support ring 56 also has an annular flange or rib 58 which is located generally centrally of the sleeve part 57 and projects radially outwardly therefrom, whereby the support ring 56 has a generally T-shaped profile when viewed in axial cross section.

Poppet valve 55 also has an integral one-piece poppet ring 59 of elastomeric or rubber like material fixed on the support ring 56 in surrounding relationship thereto, such as by being molded thereon. This poppet ring 59 has an outer diameter significantly greater than the diameter of the bores 16 and 23 so as to project radially outwardly into the annular space 25 defined between the opposed pair of valve seats 27-28. The poppet ring 59 defines thereon a pair of exterior and generally axially oppositely facing seal faces 61 and 62, which seal faces 61 and 62 extend approximately in perpendicular relationship with one another. That is, the seal faces 61 and 62 individually slope radially outwardly at an angle of approximately 45° relative to the longitudinal axis 63 of the shiftable valve arrangement, whereby the poppet valve 55 has a generally triangular configuration with the apex of the triangular configuration projecting radially outwardly.

Each of the seal faces 61 and 62 is defined on a mass of elastomeric material which, viewed in axial cross section, has a generally triangular profile so that engagement between the seal face 61, 62 and the respective valve seat 27, 28 results in contact at a location backed by a significant mass of elastomeric material. Further, the two triangular-shaped masses of elastomeric material defining the seal faces 61 and 62, even though disposed on opposite sides of the support rib 58 so as to effectively function independently of one another, are nevertheless integrally molded and hence joined together by part of the poppet ring 59 molded around the radially outer end of the flange 58. This facilitates molding of the poppet ring and provides increased mold precision and poppet durability, particularly with respect to bonding or securement of the elastomeric poppet ring 59 to the support ring 56. The poppet ring 59 is preferably molded of an elastomer such as a nitrile rubber and preferably has a Shore A durometer in the range of about 60 to about 80.

The valve arrangement 14, in the illustrated embodiment is normally maintained in a first end position wherein poppet valve 55 sealingly engages the valve seat 27. This is achieved by a biasing structure, specifically a coil spring 64, which extends coaxially into the hollow interior of the rod 36. The coil spring 64 has one end thereof seated against the end cap 18, and the other end seated against an interior shoulder formed on the rod 36 so as to continuously urge the valve arrangement 14 into an end position defined by engagement of the poppet 55 with the valve seat 27.

Valve arrangement 14 can be shifted rightwardly, in opposition to the urging of spring 64, by means of the solenoid operator 12. This solenoid operator 12 is of generally conventional construction and includes a housing 71 which mounts therein a conventional solenoid winding 72, the latter surrounding an inner housing sleeve 73 which defines a bore 74 which is substantially aligned with the bore in the valve assembly. A solenoid plunger armature 75 is slidably supported within bore 74, and additionally includes a plunger rod 76 slidably supported coaxially thereon so that one end of this rod projects outwardly for alignment with and abutting contact with an end plate 77 which in turn abuts the end of the valve rod 36. The plunger rod 76 has the outer end thereof adapted to abuttingly contact a stop 78 which is threadedly adjustably secured to the plunger armature 75. When the solenoid is energized, plunger sleeve 75 and rod 76 are moved axially inwardly (rightwardly in FIG. 1) to shift the valve arrangement 14 from a leftward-most end position into a rightward-most end position wherein poppet valve 55 sealingly engages the valve seat 28.

The solenoid housing is suitably fixedly secured relative to the valve body 13, and includes an annular guide part 81 which projects coaxially into the free end of the bore 16. To achieve a sealed relationship between the valve and solenoid assemblies, an elastomeric seal ring 82 is disposed within the bore 16 and creates a sealed relationship between the inner wall of bore 16 and the outer annular wall of plunger 76. This seal ring prevents pressurized air in the valve assembly from flowing into the interior of the solenoid operator. The ring 82 is preferably constructed so as to have a generally X-shaped cross section defined by four uniform beads, namely a pair of axially spaced radially outer beads and a pair of axially spaced radially inner beads, such ring being conventionally known as a "quad" ring.

OPERATION

The operation of the valve will first be described when it is connected for "normally closed" operation.

When the solenoid operator 12 is de-energized, spring 64 maintains the valve arrangement 14 in the leftward-most end position, whereby the pressure fluid supplied to inlet port 31 is isolated. Since the pressurized annular chamber surrounding valve rod portion 39 has seals of equal diameter at each end, as defined by seal ring 44 and poppet ring 59 as engaged with valve seat 27, the pressure forces imposed on the valve arrangement 14 from the inlet port 31 are axially balanced. At the same time, load port 26 is in open communication with exhaust port 32. Similarly, the chamber 65 as disposed between the seal rings 44 and 82 likewise communicates with exhaust port 32 due to the presence of the passageway 37 extending axially of the rod 36.

When the solenoid is energized, valve arrangement 14 is shifted rightwardly so that poppet ring 59 sealingly engages valve seat 28, thereby isolating the load port 26 from the exhaust port 32. Pressure fluid then flows from supply port 31 into the load port 26. In this open condition, pressurized fluid acting on the valve arrangement 14 is again axially balanced since it acts leftwardly against the seal 44 and leftwardly against a portion of poppet face 62 disposed outwardly from the valve seat 28, and these pressure forces in turn are balanced by the pressure forces which act rightwardly against the entire axial side face 61 of the poppet valve.

During shifting, only minimal frictional force must be overcome since the primary frictional force exists between the outer lobe 48 of seal ring 44 and the opposed wall of the bore 16. While sliding also occurs between the plunger rod 76 and the inner diameter of the seal ring 82, nevertheless the area at this point is greatly minimized since it engages the seal ring on the inner diameter, and thus this significantly minimizes the frictional force which must be overcome to permit axial shifting of the valve arrangement 14.

When the valve unit is coupled so as to be operated in a "normally open" condition, then the pressure fluid is connected to port 32, and port 31 functions as an exhaust. With the solenoid de-energized, pressure fluid from port 32 is supplied directly to the load port 26, and the exhaust port 31 is normally closed. The pressure fluid supplied to port 32 acts against the poppet valve 55 and creates a leftwardly-directed pressure force based on the area disposed inside the diameter of the valve seat 27. However, the pressure fluid from port 32 also passes axially through the rod passage 37 into the chamber 65, and hence imposes a rightwardly directed pressure force onto the valve arrangement 14 over an area inside the diameter of the bore 16, which diameter corresponds to the diameter of the valve seat 27. Hence, the pressure fluid acting on the valve arrangement 14 in this "normally open" condition is still substantially axially balanced. When solenoid 12 is energized to shift the valve arrangement 14 rightwardly, the supply port 32 is isolated from the load port 26, and the load port 26 in turn communicates with the exhaust port 31, but the pressure forces imposed axially on the valve arrangement 14 are still balanced inasmuch as the pressure forces existing within the bore 23 act leftwardly on the poppet valve 55 and are balanced by the pressure forces present in the chamber 65 which act rightwardly on the valve arrangement.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A solenoid-operated, single-stem, three-way valve assembly, comprising:
   housing means including a valve body having stepped cylindrical bore means formed therein and extending therethrough between opposite end faces of the valve body, said cylindrical bore means including a first cylindrical bore extending inwardly from one end face and coaxially communicating with a second cylindrical bore which is of larger diameter and which extends outwardly through the other end face, said first and second bores at their point of communication being joined together by an annular shoulder defined on said valve body, said annular shoulder defining thereon a first annular valve seat in surrounding relationship to said first cylindrical bore;

said housing means including an end cap stationarily and sealingly seated within an outer end of said second cylindrical bore, said end cap having a sleeve part which projects coaxially inwardly into said second cylindrical bore and which defines therein a third cylindrical bore of a diameter substantially equal to that of said first cylindrical bore, said sleeve part terminating in a free inner axial end which is opposed but spaced axially from said shoulder and which defines thereon a second annular valve seat in surrounding relationship to said third cylindrical bore;

a load port formed in said valve body and communicating with said stepped bore through an annular gap defined between said first and second valve seats;

a first port formed in said valve body and communicating directly with said first cylindrical bore at a location disposed axially on one side of said first and second valve seats;

a second port formed in said valve body and communicating directly with said second cylindrical bore at a location disposed axially on the other side of said first and second valve seats;

a single elongated and axially shiftable valve positioned within said cylindrical bore means for controlling flow of fluid between said ports, said valve including an elongated rod like stem disposed within and extending substantially coaxially through said bore means, said stem having a first end portion which is axially slidably supported within said first cylindrical bore at a location disposed axially outwardly from said first port, and said stem having a second end portion which is axially slidably supported within said end cap;

said valve including a single annular poppet-type valve member fixedly mounted on said stem in encircling relationship therewith, said poppet-type valve member projecting radially outwardly into the annular gap between said first and second valve seats and being axially movable therebetween for alternate sealing engagement therewith;

first elastomeric seal ring means mounted on said first end portion of said stem in surrounding relationship thereto and disposed in sliding and sealing engagement with the wall defining said first cylindrical bore;

electric solenoid means for effecting axial shifting of said valve from a first end position to a second end position, said solenoid means including a plunger-type actuator projecting coaxially into engagement with said one end portion of said stem;

second elastomeric seal ring means sealingly cooperating between said actuator and the wall surrounding said first cylindrical bore, said second seal ring means being disposed axially outwardly from said first seal ring means so as to define an annular chamber therebetween; and a pressure balancing passageway extending through said stem and having one end thereof in continuous communication with said annular chamber and the other end thereof in continuous communication with said second port.

2. A valve assembly according to claim 1, wherein said end cap has a blind bore formed therein in coaxial communication with said third cylindrical bore, said blind bore being of smaller diameter than said third cylindrical bore, said second end portion of said stem being loosely and non-sealingly slidably supported within said blind bore, and said sleeve part having opening means extending radially therethrough for direct communication with said second port.

3. A valve assembly according to claim 2, wherein said poppet-type valve member includes a support ring having an elastomeric poppet ring molded therearound, said support ring including axially-elongate sleeve part having a press fit engagement in surrounding relationship to the stem, said support ring also having an annular flange which is fixed to the sleeve part at a location intermediate the axial ends thereof an which projects radially outwardly therefrom, and said elastomeric poppet ring comprising an integral annular one-piece ring which externally surrounds said flange and said sleeve part and which includes enlarged elastomeric portions disposed on axially opposite sides of the radial flange, said elastomeric portions defining thereon exterior seal faces adapted to sealingly contact the respective said valve seats, the seal faces extending transversely with respect to one another.

4. A valve assembly according to claim 3, wherein said first end portion of said stem includes a surrounding annular groove for confining said first seal ring means therein, said groove being defined by an annular bottom wall having first and second annular bottom wall portions which are axially adjacent and of slightly different diameters, and said first elastomeric ring means being a quad-type ring having a pair of axially-spaced radially outer lobes and a pair of axially-spaced radially inner lobes, one of the radially inner lobes being engaged with said first annular wall portion and the other of said radially inner lobes being engaged with said second annular wall portion.

5. A valve assembly according to claim 1, wherein said first end portion of said stem includes a surrounding annular groove for confining said first seal ring means therein, said groove being defined by an annular bottom wall having first and second annular bottom wall portions which are axially adjacent and of slightly different diameters, and said first elastomeric ring means being a quad-type ring having a pair of axially-spaced radially outer lobes and a pair of axially-spaced radially inner lobes, one of the radially inner lobes being engaged with said first annular wall portion and the other of said radially inner lobes being engaged with said second annular wall portion.

6. A valve assembly according to claim 1, wherein said poppet-type valve member includes a support ring having an elastomeric poppet ring molded therearound, said support ring including axially-elongate sleeve part having a press fit engagement in surrounding relationship to the stem, said support ring also having an annular flange which is fixed to the sleeve part at a location intermediate the axial ends thereof and which projects radially outwardly therefrom, and said elastomeric poppet ring comprising an integral annular one-piece ring which externally surrounds said flange and said sleeve part and which includes enlarged elastomeric portions disposed on axially opposite sides of the radial flange, said elastomeric portions defining thereon exterior seal faces adapted to sealingly contact the respective said valve seats, the seal faces extending transversely with respect to one another.

* * * * *